(12) United States Patent
   Wong

(10) Patent No.: US 11,887,005 B2
(45) Date of Patent: Jan. 30, 2024

(54) CONTENT ADAPTIVE ATTENTION MODEL FOR NEURAL NETWORK-BASED IMAGE AND VIDEO ENCODERS

(71) Applicant: INTEL CORPORATION, Santa Clara, CA (US)

(72) Inventor: Man Lan Wong, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 114 days.

(21) Appl. No.: 17/254,056

(22) PCT Filed: Dec. 3, 2018

(86) PCT No.: PCT/CN2018/118847
§ 371 (c)(1),
(2) Date: Dec. 18, 2020

(87) PCT Pub. No.: WO2020/113355
PCT Pub. Date: Jun. 11, 2020

(65) Prior Publication Data
US 2021/0366161 A1    Nov. 25, 2021

(51) Int. Cl.
*G06N 3/084* (2023.01)
*G06N 3/10* (2006.01)
(Continued)

(52) U.S. Cl.
CPC ........... *G06N 3/084* (2013.01); *G06N 3/10* (2013.01); *G06T 9/002* (2013.01); *G06V 10/454* (2022.01);
(Continued)

(58) Field of Classification Search
None
See application file for complete search history.

(56) References Cited

U.S. PATENT DOCUMENTS

| 10,984,758 B1* | 4/2021 | Croxford ............... G09G 5/391 |
| 2012/0328161 A1 | 12/2012 | Palenychka et al. |

(Continued)

FOREIGN PATENT DOCUMENTS

| CN | 103793925 A | 5/2014 |
| CN | 106778776 A | 5/2017 |

(Continued)

OTHER PUBLICATIONS

International Search Report and Written Opinion for the International Patent Application No. PCT/CN2018/118847, dated Aug. 23, 2019, 8 pages.

(Continued)

*Primary Examiner* — Mikhail Itskovich
(74) *Attorney, Agent, or Firm* — Akona IP PC

(57) ABSTRACT

Various embodiments are generally directed to using attention models in neural network-based image and video encoders and/or decoders. A first feature map of a first image may be generated by a first layer of a neural network, the neural network executing on a computer processor to encode the first image. An attention layer of the neural network may compute an adaptive spatial saliency map for the first feature map of the first image based on the first feature map of the first image. The neural network may then perform an element-wise multiplication of the first feature map and the adaptive spatial saliency map for the first feature map to generate a modulated feature map to encode the first image.

25 Claims, 9 Drawing Sheets

(51) Int. Cl.
*G06V 10/82* (2022.01)
*H04N 23/695* (2023.01)
*G06T 9/00* (2006.01)
*G06V 10/44* (2022.01)
*G06V 10/46* (2022.01)

(52) U.S. Cl.
CPC ............ *G06V 10/462* (2022.01); *G06V 10/82* (2022.01); *H04N 23/695* (2023.01)

(56) References Cited

U.S. PATENT DOCUMENTS

2017/0289434 A1* 10/2017 Eslami ................. H04N 23/635
2018/0129902 A1 5/2018 Li
2021/0049468 A1* 2/2021 Karras .................. H04N 19/85

FOREIGN PATENT DOCUMENTS

CN 108447048 A 8/2018
CN 108734290 A 11/2018

OTHER PUBLICATIONS

Sheng-hua Zhong et al. "Video Saliency Detection via Dynamic Consistent Spatio-Temporal Attention Modelling" "Proceedings of the Twenty-Seventh AAAI Conference on Artificial Intelligence", Jul. 18, 2013.

\* cited by examiner

CONTENT ADAPTIVE ATTENTION MODEL FOR NEURAL NETWORK-BASED IMAGE AND VIDEO ENCODERS

CROSS-REFERENCE TO RELATED APPLICATION

This application is a national stage application claiming the benefit of and priority to International Application No. PCT/CN2018/118847 entitled "A CONTENT ADAPTIVE ATTENTION MODEL FOR NEURAL NETWORK-BASED IMAGE AND VIDEO ENCODERS" filed Dec. 3, 2018, which is hereby incorporated by reference in its entirety.

TECHNICAL FIELD

Embodiments described herein relate to the field of image and/or video coding. More specifically, embodiments described herein relate to using content adaptive attention models for neural-network based image and video encoders and decoders.

BACKGROUND

Deep neural networks (DNNs) are tools for solving complex problems across a wide range of domains such as computer vision, image recognition, image processing, speech processing, natural language processing, language translation, and autonomous vehicles. One example of a DNN is a convolutional neural network (CNN). Recently, DNNs have been used for encoding and/or decoding images and/or video. However, these solutions do not consider that image patches with different types of textures and patterns have different impacts in the human visual system (HVS). For example, humans are more sensitive to noise in plain textures than to noise in high frequency textures, and are more sensitive to brightness changes in dark areas than to brightness changes in bright areas. Therefore, conventional DNN solutions may omit relevant detail when encoding images and/or video because the DNNs are not aware of the sensitivities of the HVS.

DETAILED DESCRIPTION

Figure 1:
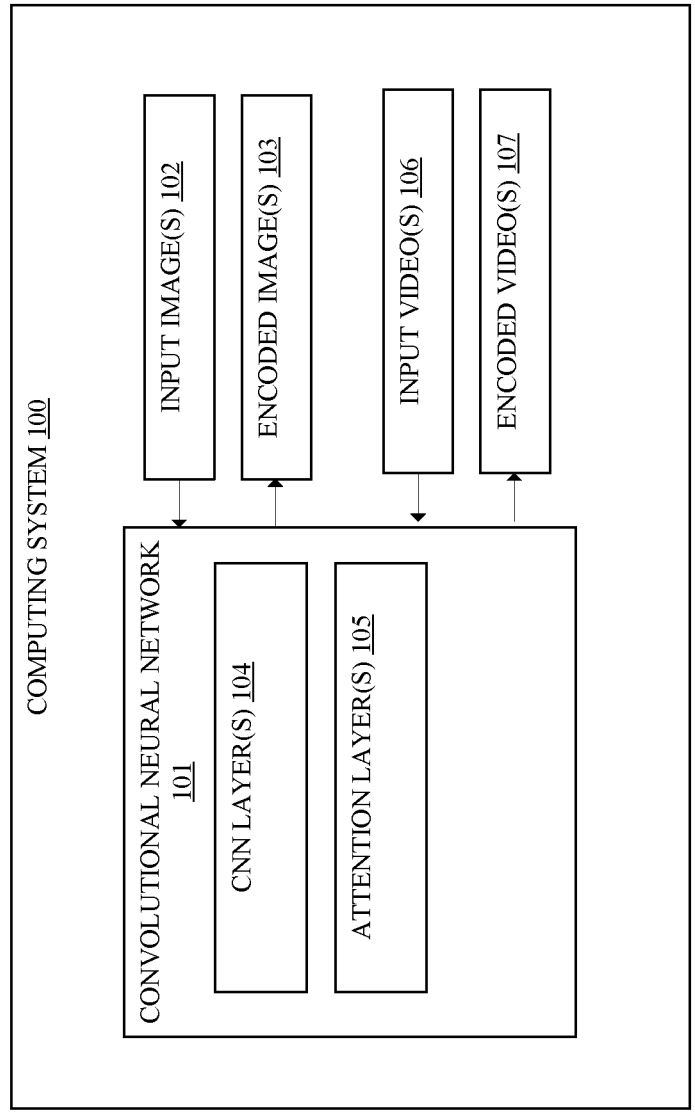
FIG. 1 illustrates an embodiment of a system.

Embodiments disclosed herein provide an innovative attention layer that can be integrated into any neural network-based encoders for images and/or videos to enhance the visual quality of the encoded images and/or videos. The attention layer can be inserted after any number and type of layers of the neural network-based encoder to learn which parts in the layer are more important from the perspective of the human visual system (HVS). Doing so allows the neural network-based encoder to allocate more bits to image regions that are important from the perspective of the HVS to encode images at higher levels of image quality at the same bitrate. Doing so improves the quality of encoded images compared to conventional systems while keeping the bitrate constant, thereby improving system performance while encoding images.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a computing system 100 that encodes images and/or video using attention models in neural network-based encoders and/or decoders. The computing system 100 may be any type of computing system, such as a server, workstation, laptop, or virtualized computing system. For example, the system 100 may be an embedded system such as a deep learning accelerator card, a processor with deep learning acceleration, a neural compute stick, or the like. In some examples, the system 100 comprises a System on a Chip (SoC) and, in other embodiments, the system 100 includes a printed circuit board or a chip package with two or more discrete components. The configuration of the computing system 100 depicted in FIG. 1 should not be considered limiting of the disclosure, as the disclosure is applicable to other configurations. For example, one or more components of the computing system 100 may be located on different computing systems 100. As another example, the functionality of one or depicted components of the computing system 100 may be consolidated into a single component.

As shown, the encoding system 100 includes one or more convolutional neural networks 101, one or more input images 102, one or more encoded images 103, one or more input videos 106, and one or more encoded videos 107. The convolutional neural network (CNN) 101 is configured to receive an input image 102 as input and encode the input image 102 according to one or more encoding formats to generate a corresponding encoded image 103. Similarly, the CNN 101 is configured to receive an input video 106 as input and encode the input video 106 according to one or more encoding formats to generate a corresponding encoded video 107. In operation, the output generated by the CNN 101 (e.g., the encoded images 103 and/or the encoded videos 107) define values of latent variables that represent features of the input images 102 and/or the input videos 106. The values of the latent variables may include values for the latent variables at one or more time steps. The CNN 101 (and/or a different instance of the CNN 101) may further be used to decode the encoded images 103 and/or encoded videos 107. The CNN 101 may perform other operations when encoding input images 102 and/or input videos 106, such as compression, encryption, and/or modification of the input images 102 and/or input videos 106. Therefore, the use of encoding as an example herein should not be considered limiting of the disclosure. Furthermore, the use of a CNN 101 as a reference example herein should not be considered limiting of the disclosure, as the disclosure is equally applicable to other types of neural network-based image and/or video encoders.

The CNN 101 is representative of hardware, software, or a combination thereof. A neural network generally implements dynamic programing to determine and solve for an approximated value function. The CNN 101 is formed of a cascade of multiple layers of nonlinear processing units for feature extraction and transformation. Generally, each successive layer of the CNN uses the output from the previous layer as input. The convolutional neural network 101 may generally include an input layer, an output layer, and multiple hidden layers. The hidden layers of the CNN 101 may include convolutional layers, pooling layers, fully connected layers, SoftMax layers, and/or normalization layers. Illustratively, the convolutional neural network 101 includes the CNN layers 104, which are representative of the input layer, output layer, and hidden layers. Furthermore, the convolutional neural network 101 includes one or more attention layers 105, described in greater detail below. Once added to the convolutional neural network 101, the attention layers 105 are layers of the convolutional neural network 101 (e.g., the added attention layers 105 are one or more of the CNN layers 104).

Generally, a neural network includes two processing phases, a training phase and an inference phase. During the training process, a deep learning expert will typically architect the network, establishing the number of layers in the neural network, including one or more attention layers 105, the operation performed by each layer, and the connectivity between layers. Many layers have parameters, typically filter weights, that determine exact computation performed by the layer. The objective of the training process is to learn the filter weights, usually via a stochastic gradient descent-based excursion through the space of weights. The training phase generates an output feature map. A feature map may be generated for each convolutional layer of the neural network. The output feature map of a given convolutional layer may be the input to the next convolutional layer. Once the training process is complete, inference based on the trained neural network (e.g., image and/or video encoding, image and/or video decoding) typically employs a forward-propagation calculation for input data to generate output data.

For example, the computing system 100 may provide the CNN 101 with cascaded stages for image and/or video encoding, image and/or video decoding, face detection, character recognition, speech recognition, or the like. The CNN 101 may then perform training based on an input dataset (e.g., images, videos, etc.) that is in the form of tensor data. A tensor is a geometric object that describes linear relations between geometric vectors, scalars, and other tensors. An organized multidimensional array of numerical values, or tensor data, may represent a tensor. The training may produce refined weights for the neural network 101. For example, the refined weights in each attention layer 105 may correspond to features, or visual elements, that attract the HVS (also referred to as being associated with the HVS). Example visual elements that attract the HVS are faces, humans, objects, and high contrast regions of an image. By specifying weights in the attention layers 105 that focus on these regions, the CNN 101 may encode images and/or videos at greater visual quality at the same bitrate relative to neural networks that encode images and/or video without the attention layers 105.

As stated, one or more attention layers 105 may be added to the CNN 101. In one embodiment, an attention layer 105 is added after each CNN layer 104 of the CNN 101. For example, if the CNN 101 includes fifty CNN layers 104, fifty attention layers 105 may be added to the CNN 101, where each individual attention layer 105 follows one of the CNN layers 104. More generally, "n" attention layers 105 may be added to the CNN 101, where "n" is a positive integer. Regardless of the number of attention layers 105 in the CNN 101, a given attention layer 105 is connected to the output (e.g., a feature map) of the previous connected CNN layer 104.

Once the attention layers 105 are added to the CNN 101, the CNN 101 may be trained to learn which regions in a given feature map are more sensitive to the HVS (e.g., regions depicting visual elements such as faces, etc.) through the proper definition of the loss function using quality metrics (e.g., structural similarity (SSIM) index, universal image quality (UIQI) index, etc.) that are related to subjective and/or objective quality measurement based on the HVS. This guides the CNN 101 to pay more attention to regions that are more sensitive to the HVS when encoding images and/or videos. Stated differently, the CNN 101 allocates more bits to the regions of images that are sensitive to the HVS when encoding images and/or video. Therefore, the CNN 101 encodes the encoded images 103 and/or the encoded videos 107 such that more bits are allocated to the regions that are sensitive to the HVS (e.g., regions depicting visual elements such as faces, humans, etc.) relative to the number of bits allocated to such regions by the CNN 101 when encoding without using the attention layers 105. Doing so increases the visual quality of the encoded images 103 and/or the encoded videos 107 and improves the encoding efficiency of the CNN 101 while keeping the bitrate constant.

As stated, the CNN 101 may be trained by any type of neural network algorithm, such as an autoencoder neural network, generative adversarial network (GAN), reversible generative models, etc. The trained CNN 101, by including attention layers 105 after some or all of the CNN layers 104, improves the encoding efficiency of the CNN 101. Generally, based on the output of a CNN layer 104 (e.g., a feature map), the attention layer 105 computes an adaptive spatial saliency map for the feature map. In addition, when encoding videos, the attention layer computes an adaptive spatial and temporal saliency map for the feature map.

Figure 2A:
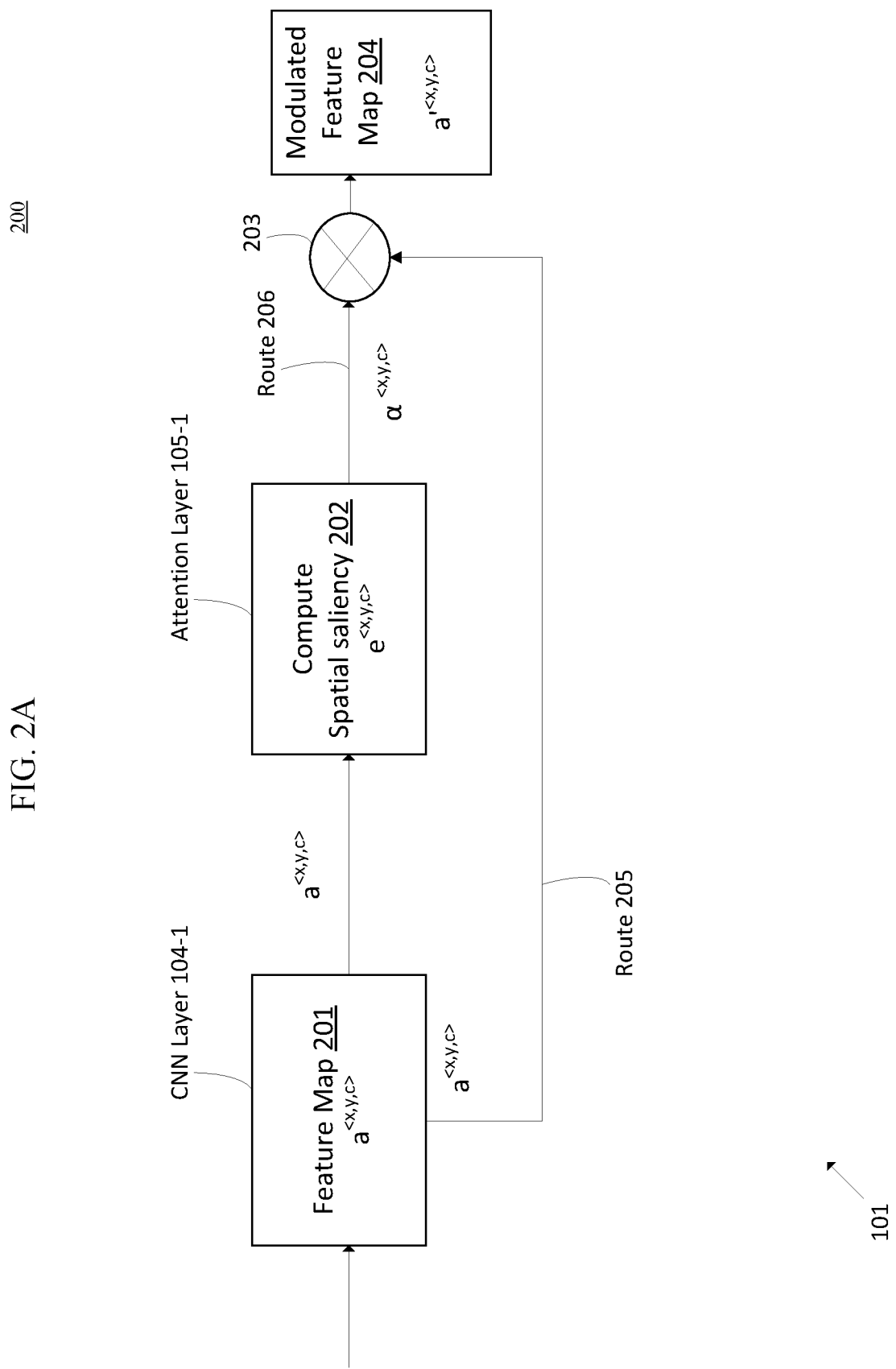
FIGS. 2A-2B illustrate examples of content adaptive attention models for neural network-based image and video encoders.

FIG. 2A is a schematic 200 illustrating an example of adding an attention layer 105-1 after an example CNN layer 104-1 to encode images. Given an input image 102, the CNN layer 104-1 represents a hidden convolutional layer of the convolutional neural network 101. As such, the CNN layer 104-1 may compute and output a feature map 201. An activation in the feature map 201 may denoted by $a^{<x,y,c>}$, where x corresponds to the horizontal axis of the activation in the feature map 201, y corresponds to the vertical axis of the activation in the feature map 201, and c corresponds to the channel of the activation in the feature map 201. For example, the CNN layer 104-1 may be a convolution layer that computes a convolution of the input image and a weight matrix (not pictured) of the CNN layer 104-1 to obtain the feature map 201.

As shown, the attention layer 105-1 receives the feature map 201 as input. As stated, during training, refined weight values of a weight matrix (or kernel) of the attention layer 105-1 are learned. The attention layer 105-1 may perform one or more convolution operations using the feature map 201 and the weight matrix (or matrices) of the attention layer 105-1 to compute the adaptive spatial saliency map 202 (or matrix), denoted by $e^{<x,y,c>}$. The dimensions of $e^{<x,y,c>}$ and $a^{<x,y,c>}$ are equal. In at least one embodiment, the attention layer 105-1 computes the adaptive spatial saliency map 202, or $e^{<x,y,c>}$, using a depthwise convolutional layer. For example, to compute the $3^{rd}$ channel of e at position $(x_0, y_0)$ with a 3×3 weight kernel of the attention layer 105-1 with 3 output channels (c=3), either all $a^{<x,y,0>}$, $a^{<x,y,1>}$, $a^{<x,y,2>}$ from the feature map 201 are used as inputs, or only $a^{<x,y,2>}$ from the feature map 201 is used as input, where $x=\{x_0-1, x_0, x_0+1\}$ and $y=\{y_0-1, y_0, y_0+1\}$.

Furthermore, in at least one embodiment, the attention layer 105-1 may apply a subsequent SoftMax function (e.g., via a cascaded SoftMax layer following the attention layer 105-1, not shown in FIG. 2A) to all computed $e^{<x,y,c>}$ of the spatial saliency map 202 to compute the final output of the attention layer 105-1, represented as $a'^{<x,y,c>}$. Doing so ensures that the sum of all values of the spatial saliency map 202 equals one. In some embodiments, the SoftMax function is applied channel-wise (e.g., to each channel independently) according to the following equation:

$$\alpha^{<x,y,c>} = \frac{\exp(e^{<x,y,c>})}{\sum_y \sum_x \exp(e^{<x,y,c>})}. \quad \text{Equation 1}$$

In other embodiments, the SoftMax function is applied to all channels (e.g., all channels collectively) according to the following equation:

$$\alpha^{<x,y,c>} = \frac{\exp(e^{<x,y,c>})}{\sum_c \sum_y \sum_x \exp(e^{<x,y,c>})}. \quad \text{Equation 2}$$

At block 203, the CNN 101 performs an element-wise multiplication of the output of the attention layer 105-1 ($a^{<x,y,c>}$), and the original feature map 201 ($a^{<x,y,c>}$) computed by the CNN layer 104-1. Doing so generates a modulated feature map 204 ($a'^{<x,y,c>}$) which has relatively higher activations on portions of the input image 102 that are regions of interest to the HVS (e.g., depict visual elements such as faces, humans, objects, etc.), and relatively lower activations on other regions (e.g., activations in regions that are not sensitive to HVS are suppressed). The CNN 101 may then use the modulated feature map 204 to encode the input image 102 such that regions including visual elements that are of interest to the HVS may have higher levels of quality while keeping the total bitrate constant.

In some embodiments, the attention layer 105-1 may not perform the SoftMax operations described above with reference to equations 1 and 2. In such embodiments, a batch normalization process may be applied to the modulated feature map 204 (e.g., after the element-wise multiplication at block 203 of the feature map 201 and the output of the attention layer 105-1 without applying the SoftMax functions).

Figure 2B:
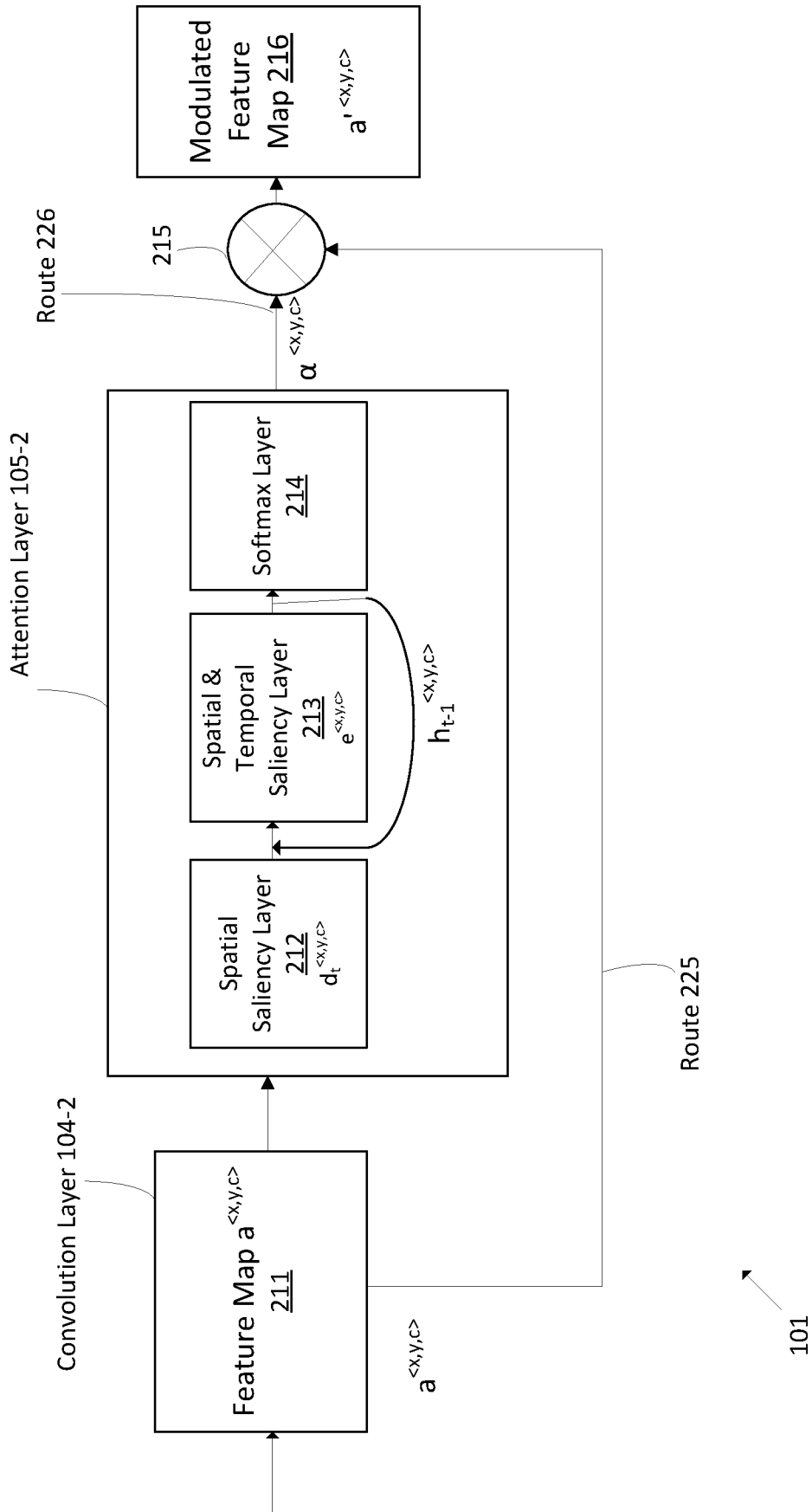

FIG. 2B is a schematic 210 illustrating an example of adding an attention layer 105-2 after an example CNN layer 104-2 to encode images of an input video 106, where CNN layer 104-2 represents a hidden convolutional layer of the convolutional neural network 101. Given at least one frame (e.g., an image) of an input video 106, the CNN layer 104-2 may compute a feature map 211, denoted by $a^{<x,y,c>}$, where x corresponds to the horizontal axis of the activation in the feature map 211, y corresponds to the vertical axis of activation in the feature map 211, and c corresponds to the channel of activation in the feature map 211. For example, the CNN layer 104-2 may be a convolution layer that computes a convolution of the image of the input video 106 and a weight matrix (not pictured) of the CNN layer 104-2.

As shown, the attention layer 105-2 includes a spatial saliency layer 212, a spatial and temporal saliency layer 213, and a SoftMax layer 214. Generally, the attention layer 105-2 may receive the feature map 211 generated by the convolution layer 104-2. To capture the spatial saliency and the temporal saliency of the feature map 211, the attention layer 105-2 uses similar techniques described with reference to FIG. 2A to generate an initial spatial saliency map using the weights of the attention layer 105-2 and the feature map 211. More specifically, the spatial saliency layer 212 computes a spatial saliency map $d_t^{<x,y,c>}$ (which corresponds to $e^{<x,y,c>}$ in FIG. 2A). As in FIG. 2A, the spatial saliency map $d_t^{<x,y,c>}$ is computed using one or more convolutional layers by performing convolution operations on the weights of the spatial saliency layer 212 and the feature map 211. When computing $d_t^{<x,y,c_0>}$, the output activation of the spatial saliency layer 212 at time t for a given channel $c_0$, either all activations $a^{<x,y,c>}$ of the feature map 211 or only the activation $a^{<x,y,c_0>}$ of the feature map 211 coming from the same channel $c_0$ are used as input during the convolution operation(s) with the weights of the spatial saliency layer 212.

The spatial and temporal saliency layer 213 then concatenates $d_t^{<x,y,c>}$ with $h_{t-1}^{<x,y,c>}$, which has the same dimensions of $d_t^{<x,y,c>}$ and is the previous output activation of the spatial and temporal saliency layer 213. The spatial and temporal saliency layer 213 then computes $e^{<x,y,c>}$ (referred to as a spatial and temporal saliency map) based on the concatenation of $d_t^{<x,y,c>}$ and $h_{t-1}^{<x,y,c>}$, which becomes the next output activation $h_t^{<x,y,c>}$ (and is concatenated with $d_{t+1}^{<x,y,c>}$ for the next frame of the input video 106).

Therefore, the spatial and temporal saliency layer 213 is a recurrent CNN layer which captures the temporal saliency between frames of the input video 106, which may be represented by the following equation:

$$h_t^{<x,y,c>} = e^{<x,y,c>} = CNN(d_t^{<x,y,c>} \mathbf{0} \, h_{t-1}^{<x,y,c>}) \qquad \text{Equation 3.}$$

The SoftMax layer 214 applies a SoftMax function to the output of the spatial and temporal saliency layer 213 to ensure that all values $e^{<x,y,c>}$ of the spatial and temporal saliency map sum to 1. As in FIG. 2A, the SoftMax layer 214 may apply SoftMax function channel-wise (e.g., to each channel independently) according to the following equation:

$$\alpha^{<x,y,c>} = \frac{\exp(e^{<x,y,c>})}{\sum_y \sum_x \exp(e^{<x,y,c>})}. \qquad \text{Equation 4}$$

In another embodiment, the SoftMax layer 214 may apply the SoftMax function to all channels collectively according to the following equation:

$$\alpha^{<x,y,c>} = \frac{\exp(e^{<x,y,c>})}{\sum_c \sum_y \sum_x \exp(e^{<x,y,c>})}. \qquad \text{Equation 5}$$

At block 215, the CNN 101 performs an element-wise multiplication of the output of the attention layer 105-2 ($a^{<x,y,c>}$), and the original feature map 211 ($a^{<x,y,c>}$) computed by the CNN layer 104-2. Doing so generates a modulated feature map 216 ($a'^{<x,y,c>}$) which has relatively higher activations on portions of the image of the input video 106 that are regions of interest to the HVS (e.g., regions that depict visual elements such as faces, humans, etc.), and relatively lower activations on other regions (implying that activations in regions that are not sensitive to HVS are suppressed). The CNN 101 may then use the modulated feature map 204 to encode the input video 106 such that regions depicting visual elements of interest to the HVS may have higher levels of quality while keeping the total bitrate constant.

In some embodiments, the attention layer 105-2 may exclude the operations performed by the SoftMax layer 214 (e.g., equations 4 and/or 5). In such embodiments, the SoftMax function is not applied to the output of the spatial and temporal saliency layer 213. Instead, the CNN 101 may apply a batch normalization process to the modulated feature map 216 (e.g., after the element-wise multiplication at block 215 of the feature map 211 and the output of the attention layer 105-2 without the SoftMax layer 214) in lieu of applying the SoftMax layer 214.

Furthermore, the attention layers 105 advantageously facilitate improved integration of quantization stages into the CNN. For example, a quantization layer can be inserted the element-wise multiplication of $a^{<x,y,c>}$ and $a^{<x,y,c>}$ (e.g., blocks 203 and 215 of FIGS. 2A, 2B respectively). The quantization layer can then use $a^{<x,y,c>}$ as a reference to determine which regions or layers should be assigned more bits. Doing so allows the quantization stage to be adapted and sensitive to the HVS when encoding images and/or videos.

The CNN 101 may be trained according to any number and type of training processes. In one embodiment, the attention layers 105 may be trained along with the encoding functions of the CNN 101. In another embodiment, given a pre-trained neural network based image or video encoder without attention layers, the pre-trained network can be interpreted as another network having the same structure, but with attention layer(s) 105 inserted after CNN layer(s) 104 and all the outputs of the attention layer(s) 105 (e.g., $a^{<x,y,c>}$) are forced to be values of "1". In this case the pre-trained weights can be loaded directly into this new network and the weights in the attention layer(s) 105 can initially be set to random values. The pre-training of the neural network-based image or video encoder is like having gradients flow into the CNN layers 104 through one route only (e.g., into route 205 of FIG. 2A, and route 225 of FIG. 2B) during backward propagations, and the modulated feature maps are the same as the feature map of the CNN layers 104. After the pre-training phase, the constraint of having all the outputs of the attention layer(s) 105 (e.g., $a^{<x,y,c>}$) forced to be values of "1" is removed, and the CNN 101 may then be refined through retraining to let the gradients flow into both routes until convergence (e.g., into route 205 and 206 of FIG. 2A, and routes 225 and 226 of FIG. 2B).

Figure 3:
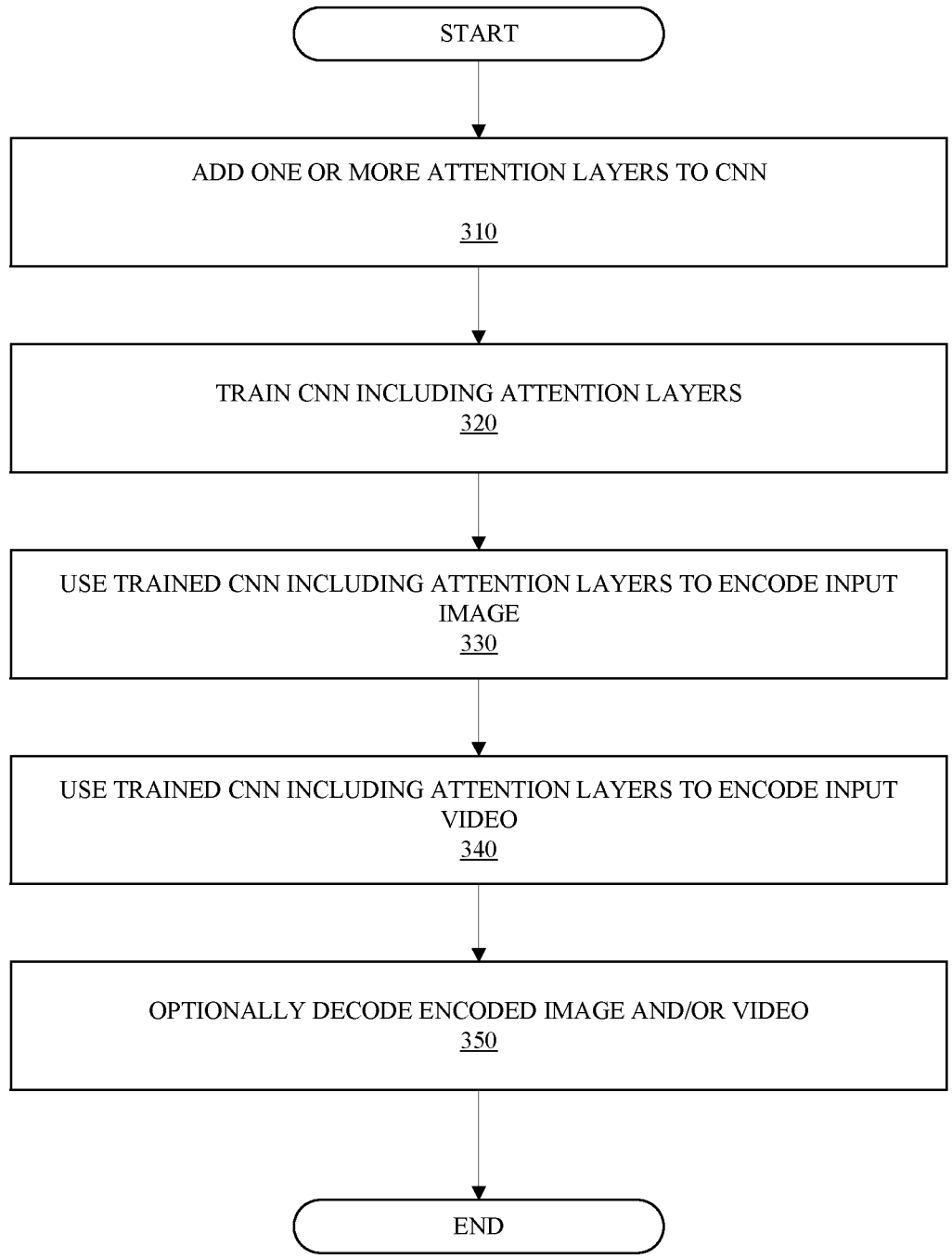
FIG. 3 illustrates an embodiment of a first logic flow.

FIG. 3 illustrates an embodiment of a logic flow 300. The logic flow 300 may be representative of some or all of the operations executed by one or more embodiments described herein. Embodiments are not limited in this context.

As shown, at block 310, one or more attention layers 105 may be added to a CNN 101. The actual number of attention layers 105 and the location of each attention layer 105 in the CNN may depend on the desired use cases. Regardless of the number of attention layers 105, at least one attention layer 105 is added to the CNN 101 after a CNN layer 104. A loss function may be defined for the CNN 101 that includes quality metrics (e.g., SSIM, UIQI, etc.). At block 320, the CNN 101 including the one or more attention layers 105 is trained. In one embodiment, the attention layers 105 may be trained along with the encoding functions of the CNN 101. In another embodiment, the CNN 101 is a pre-trained network, and the attention layers 105 are trained as described above.

At block 330, the trained CNN 101 including the attention layers 105 are used to encode an input image 102 according to one or more encoding formats, thereby producing an encoded image 103 that has a higher image quality (according to the quality metrics that are sensitive to the HVS) and the same bitrate. At block 340, trained CNN 101 including the attention layers 105 are used to encode an input video 106 according to one or more encoding formats, thereby producing an encoded video 107 that has higher quality images (according to the quality metrics that are sensitive to the HVS) and the same bitrate. At block 350, the CNN 101 (or another CNN 101) is optionally used to decode one or more encoded images 103 and/or one or more encoded videos 107.

Figure 4:
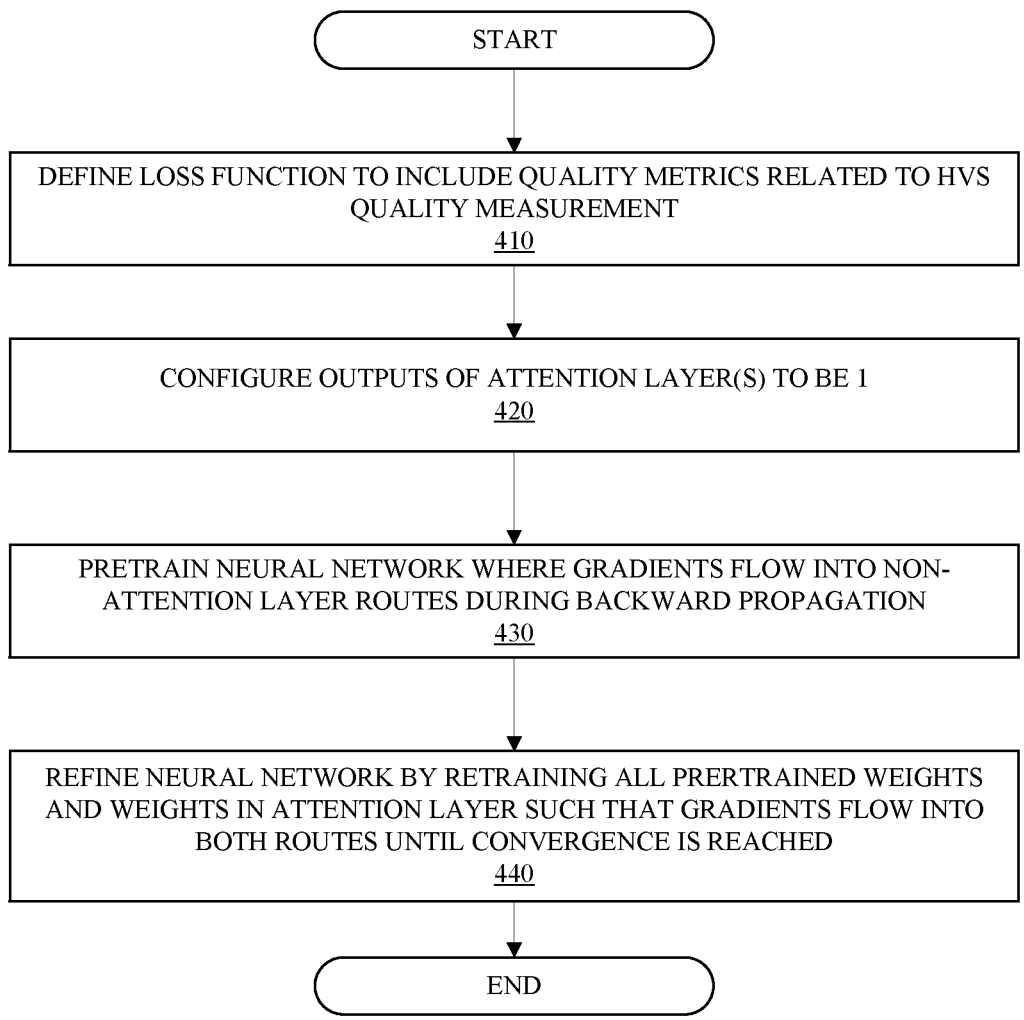
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may be representative of some or all of the operations to train the CNN 101 that includes one or more attention layers 105. Embodiments are not limited in this context.

As shown, at block 410, a loss function for the CNN 101 is defined to include one or more quality metrics that are related to HVS quality measurement. Examples of such quality metrics include SSIM, UIQI, and the like. At block 420, the outputs of each attention layer 105 in the CNN 101 is forced to be values of 1. At block 430, the CNN 101 is pre-trained such that gradients flow into non-attention layer routes (e.g., route 205 of FIG. 2A and route 225 of FIG. 2B) during backward propagation. At block 440, the CNN 101 is refined by retraining all pretrained weights and weights in each attention layer 105 such that gradients flow into both routes (e.g., route 205 and 206 of FIG. 2A, and route 225 and 226 of FIG. 2B) until convergence is reached. Doing so computes weight values (e.g., a weight matrix, or weight kernel) for each layer in the CNN 101, including the attention layers 105.

Figure 5:
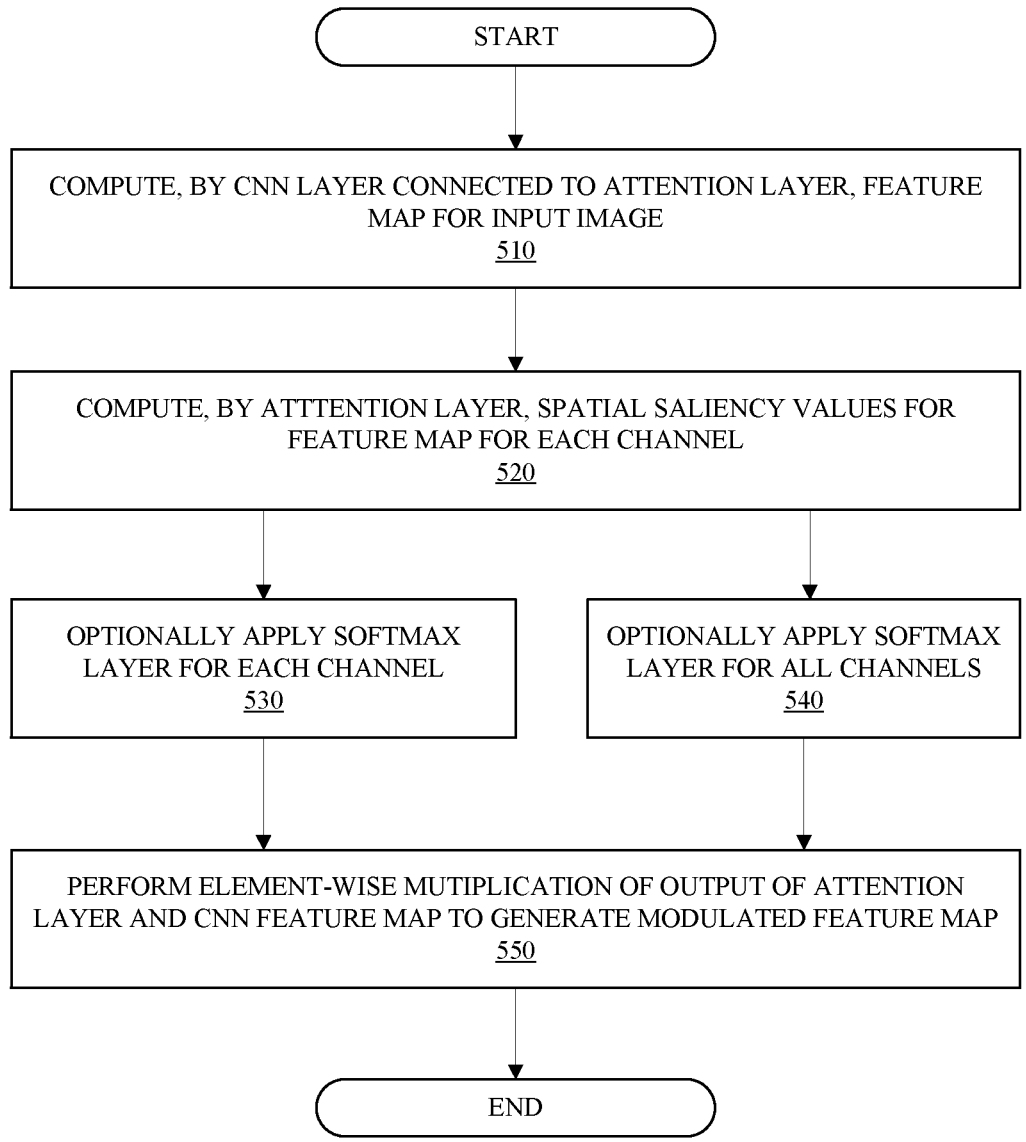
FIG. 5 illustrates an embodiment of a third logic flow.

FIG. 5 illustrates an embodiment of a logic flow 500. The logic flow 500 may be representative of some or all of the operations executed by one or more embodiments described herein. For example, the CNN 101 may perform the logic flow 500 to encode an input image 102. Embodiments are not limited in this context.

As shown, at block 510, a CNN layer 104 connected to an attention layer 105 computes a feature map $a^{<x,y,c>}$ for an input image 102 (e.g., based on a convolution operation). At block 520, the attention layer 105 computes a spatial saliency map including spatial saliency values $e^{<x,y,c>}$ for each channel of the feature map. The attention layer 105 compute the spatial saliency map by performing a convolution operation on the weights of the attention layer 105 and the feature map computed at block 510.

At block 530, the attention layer 105 may optionally apply a SoftMax layer to each channel individually. As stated, the SoftMax layer may apply a SoftMax function to each channel according to Equation 1 above. Doing so ensures that the values of $e^{<x,y,c>}$ (for all x, y) sum to 1 for each channel c. At block 540, the CNN 101 may optionally apply a SoftMax layer to all channels collectively. As stated, the SoftMax layer may apply a SoftMax function to all channels according to Equation 2 above. Doing so ensures that the values of $e^{<x,y,c>}$ sum to 1 (for all x, y, c). Regardless of whether the SoftMax layer is applied to each channel individually, or all channels collectively, the output of the attention layer 105 is the map $a^{<x,y,c>}$. At block 550, the CNN 101 performs an element-wise multiplication of the output of the attention layer 105 ($a^{<x,y,c>}$) and the feature map generated by CNN layer 104 at block 510. Doing so generates a modulated feature map that has relatively higher activations on portions of the input image 102 that are regions depicting visual elements that are of interest to the HVS, and relatively lower activations on other regions. The CNN 101 may then use the modulated feature map to encode the input image 102 at higher levels of quality while keeping the bitrate constant.

Figure 6:
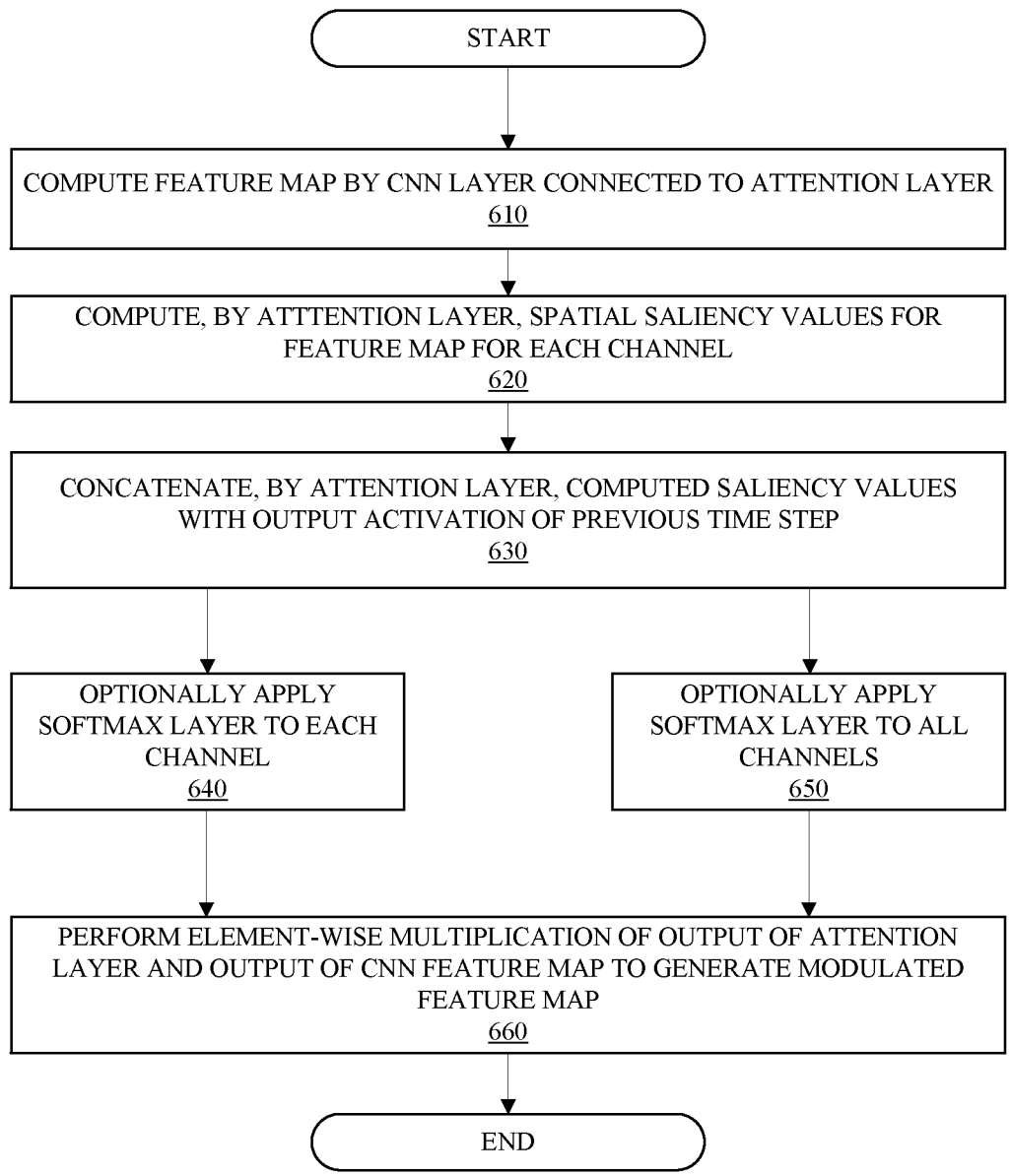
FIG. 6 illustrates an embodiment of a fourth logic flow.

FIG. 6 illustrates an embodiment of a logic flow 600. The logic flow 600 may be representative of some or all of the operations executed by one or more embodiments described herein. For example, the CNN 101 may perform the logic flow 600 to encode an input video 106 using at least one attention layer 105. Embodiments are not limited in this context.

At block 610, a CNN layer 104 connected to an attention layer 105 computes a feature map for an image (e.g., a frame) of an input video 106. At block 620, the spatial saliency layer 212 of the attention layer 105 computes a spatial saliency map comprising spatial saliency values $d^{<x,y,c>}$ for the feature map $a^{<x,y,c>}$ compute data block 610. Generally, the spatial saliency layer 212 computes the spatial saliency map by performing a convolution operation using the weights of the spatial saliency layer 212 and the feature map computed at block 610. At block 630, the spatial and temporal saliency layer 213 of the attention layer 105 concatenates the spatial saliency values $d^{<x,y,c>}$ computed at block 620 with the previous output activation $h_{t-1}^{<x,y,c>}$ computed at block 630 according to Equation 3 above. Doing so generates a spatial and temporal saliency map $h_t^{<x,y,c>}$.

At block 640, the attention layer 105 may optionally apply a SoftMax layer 214 to each channel of the spatial and temporal saliency map. As stated, the SoftMax layer 214 may apply a SoftMax function to each channel according to Equation 4 above. Doing so ensures that the values of $h_t^{<x,y,c>}$ (for all x, y) sum to 1 for a channel c. At block 650, the SoftMax layer 214 may optionally apply a SoftMax function to all channels collectively. As stated, the SoftMax layer may apply a SoftMax function to all channels according to Equation 5 above. Doing so ensures that the values of $h_t^{<x,y,c>}$ sum to 1 (for all x, y, c). Regardless of whether the SoftMax layer is applied to each channel individually, or all channels collectively, the output of the attention layer 105 is the map $a^{<x,y,c>}$. At block 660, the CNN 101 performs an element-wise multiplication of the output of the attention layer 105 ($a^{<x,y,c>}$) and the feature map $a^{<x,y,c>}$ generated by CNN layer 104 at block 610. Doing so generates a modulated feature map that has relatively higher activations on portions of the images of the input video 106 that are regions having visual elements that are of interest to the HVS, and relatively lower activations on other regions. The CNN 101 may then use the modulated feature map to encode the input video 106 at higher levels of quality while keeping the bitrate constant.

Figure 7:
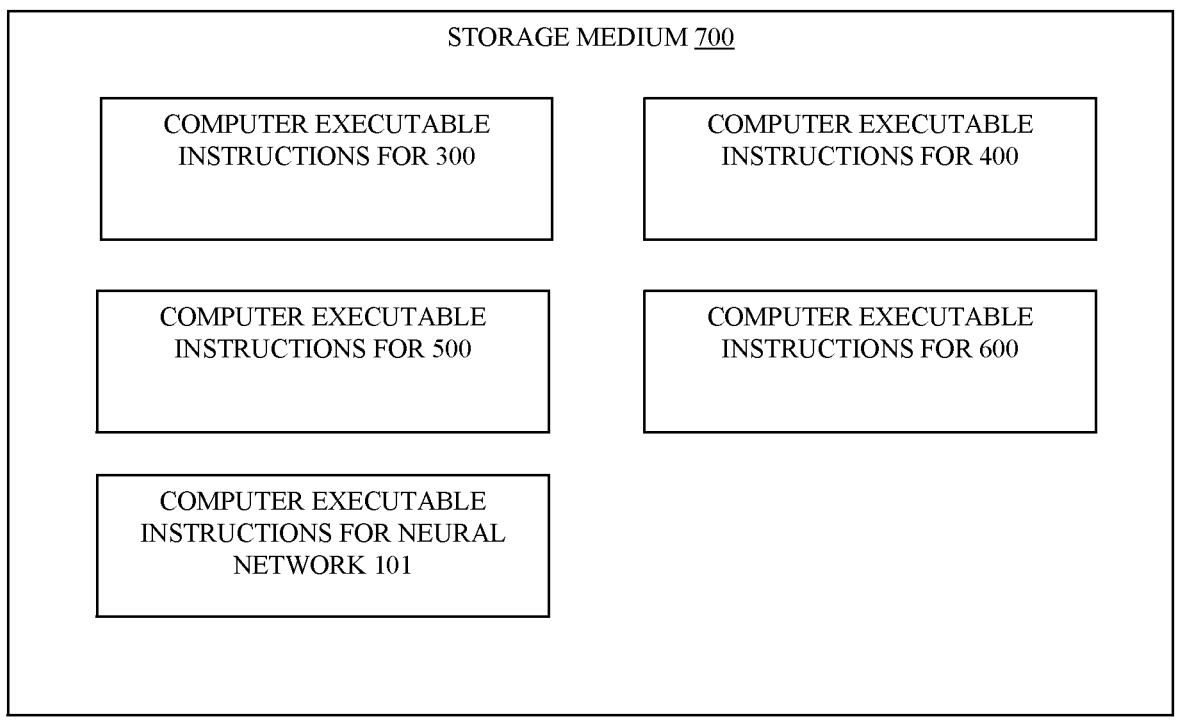
FIG. 7 illustrates an embodiment of a fifth logic flow.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to 300, 400, 500, 600 of FIGS. 3-6. The storage medium 1000 may further store computer-executable instructions for the neural network 101 (and constituent components described herein). Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
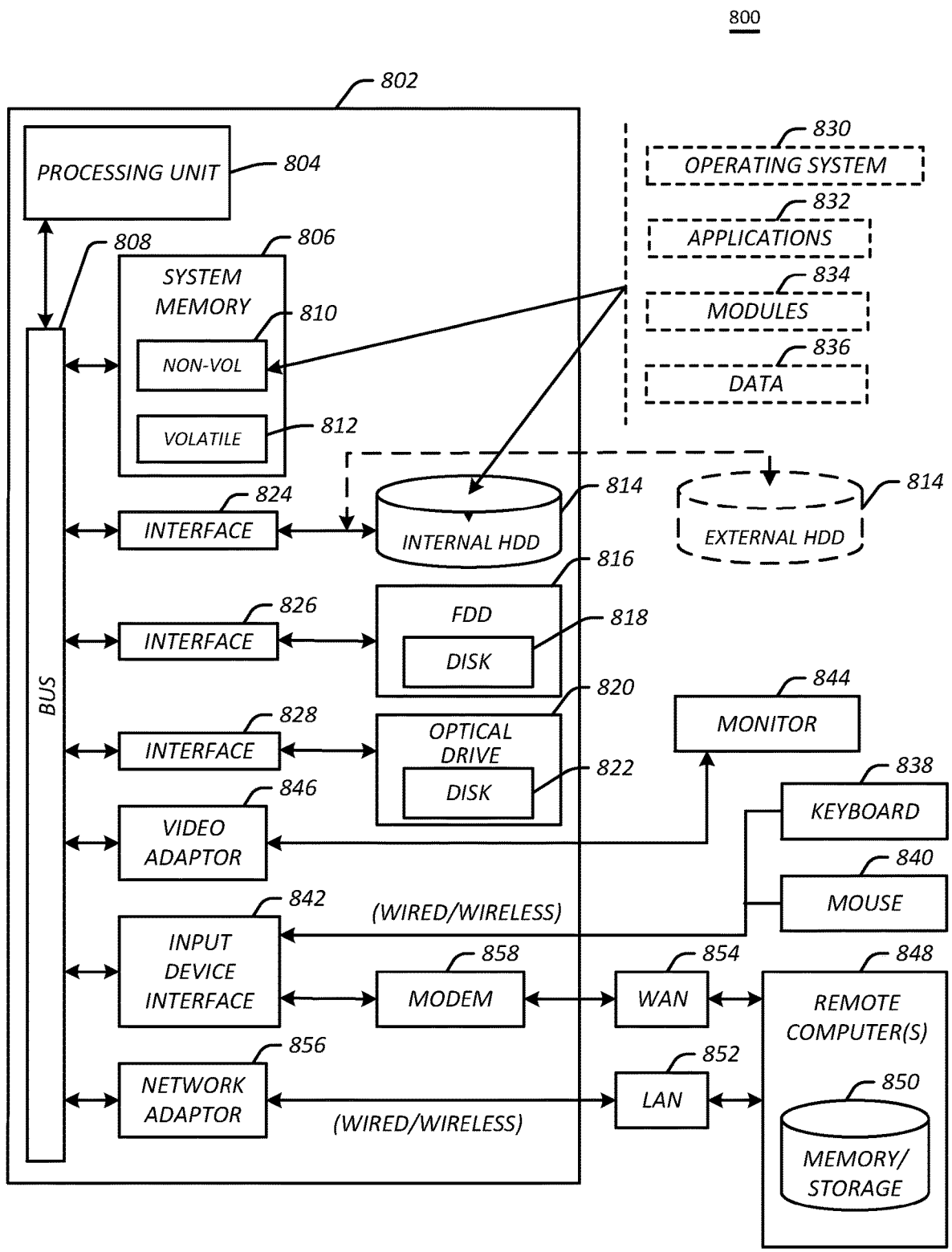
FIG. 8 illustrates an embodiment of a system.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of system 100 of FIG. 1 and FIGS. 2A-2B. The embodiments are not limited in this context. More generally, the computing architecture 800 is configured to implement all logic, systems, logic flows, methods, apparatuses, and functionality described herein and with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 (also referred to as a processor circuit) can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), bulk byte-addressable persistent memory (PMEM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the CNN 101 (including the CNN layers 104, attention layers 105, spatial saliency layer 212, spatial and temporal saliency layer 213, and SoftMax layer 214) and/or other logic described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

Example 1 is an apparatus, comprising: a processor circuit; and a memory storing instructions which when executed by the processor circuit cause the processor circuit to: generate a first feature map of a first image by a first layer of a neural network, the neural network to encode the first image; compute, by an attention layer of the neural network based on the first feature map of the first image, an adaptive spatial saliency map for the first feature map of the first image; and perform an element-wise multiplication of the first feature map and the adaptive spatial saliency map for the first feature map to generate a modulated feature map to encode the first image.

Example 2 includes the subject matter of example 1, the memory storing instructions which when executed by the processor circuit cause the processor circuit to: apply, by a SoftMax layer of the neural network, a SoftMax function to the adaptive spatial saliency map for the first feature map prior to performing the element-wise multiplication, the SoftMax function to cause a sum of each value in the adaptive spatial saliency map to equal one.

Example 3 includes the subject matter of example 2, the first image comprising a plurality of channels, the SoftMax function of the SoftMax layer applied to at least one of: (i) each of the plurality of channels collectively, and (ii) each of the plurality of channels individually.

Example 4 includes the subject matter of example 1, the neural network comprising a convolutional neural network, the adaptive spatial saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network without the attention layer.

Example 5 includes the subject matter of example 1, the first image of a video comprising at least the first image and a second image, the second image adjacent and prior to the first image in the video, the neural network to encode the video according to at least one encoding format, the memory storing instructions which when executed by the processor circuit cause the processor circuit to: concatenate the adaptive spatial saliency map for the first image and an adaptive spatial saliency map for the second image; and compute, by a second layer of the neural network, a spatial and temporal saliency map for the first image based on the concatenation of the adaptive spatial saliency map for the first image and the adaptive spatial saliency map for the second image.

Example 6 includes the subject matter of example 5, the memory storing instructions which when executed by the processor circuit cause the processor circuit to: apply, by a SoftMax layer of the neural network, a SoftMax function to the spatial and temporal saliency map for the first image, the SoftMax function to cause a sum of each value in the spatial and temporal saliency map for the first image to equal one.

Example 7 includes the subject matter of example 6, the first image comprising a plurality of channels, the SoftMax function of the SoftMax layer applied to at least one of: (i) each of the plurality of channels collectively, and (ii) each of the plurality of channels individually, the memory storing instructions which when executed by the processor circuit cause the processor circuit to: subsequent to applying the SoftMax function, perform an element-wise multiplication of the first feature map and an output of the SoftMax function to generate a modulated feature map to encode the first image as part of an encoded video.

Example 8 includes the subject matter of example 7, the neural network comprising a convolutional neural network, the spatial and temporal saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network when encoding the first image without the attention layer.

Example 9 includes the subject matter of example 1, wherein the neural network is to encode the image according to at least one encoding format, the memory storing instructions which when executed by the processor circuit cause the processor circuit to: apply a batch normalization process to the modulated feature map.

Example 10 includes the subject matter of example 1, the memory storing instructions to train the neural network which when executed by the processor circuit cause the processor circuit to: configure an output of each attention layer in the neural network to equal one; pretrain weights of the neural network where gradients flow into routes that do not include the attention layers during backward propagation; and refine the neural network by retraining all pretrained weights and weights in each attention layer such that gradients flow into all routes of the neural network until convergence is reached.

Example 11 is a non-transitory computer-readable storage medium comprising instructions that when executed by a processor of a computing device, cause the processor to: generate a first feature map of a first image by a first layer of a neural network, the neural network to encode the first image; compute, by an attention layer of the neural network based on the first feature map of the first image, an adaptive spatial saliency map for the first feature map of the first image; and perform an element-wise multiplication of the first feature map and the adaptive spatial saliency map for the first feature map to generate a modulated feature map to encode the first image.

Example 12 includes the subject matter of example 11, comprising instructions that when executed by the processor to cause the processor to: apply, by a SoftMax layer of the neural network, a SoftMax function to the adaptive spatial saliency map for the first feature map prior to performing the element-wise multiplication, the SoftMax function to cause a sum of each value in the adaptive spatial saliency map to equal one.

Example 13 includes the subject matter of example 12, the first image comprising a plurality of channels, the SoftMax function of the SoftMax layer applied to at least one of: (i) each of the plurality of channels collectively, and (ii) each of the plurality of channels individually.

Example 14 includes the subject matter of example 11, the neural network comprising a convolutional neural network, the adaptive spatial saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network without the attention layer.

Example 15 includes the subject matter of example 11, the first image of a video comprising at least the first image and a second image, the second image adjacent and prior to the first image in the video, the neural network to encode the video according to at least one encoding format, comprising instructions that when executed by the processor to cause the processor to: concatenate the adaptive spatial saliency map for the first image and an adaptive spatial saliency map for the second image; and compute, by a second layer of the neural network, a spatial and temporal saliency map for the first image based on the concatenation of the adaptive spatial saliency map for the first image and the adaptive spatial saliency map for the second image.

Example 16 includes the subject matter of example 15, comprising instructions that when executed by the processor to cause the processor to: apply, by a SoftMax layer of the neural network, a SoftMax function to the spatial and temporal saliency map for the first image, the SoftMax function to cause a sum of each value in the spatial and temporal saliency map for the first image to equal one.

Example 17 includes the subject matter of example 16, the first image comprising a plurality of channels, the SoftMax function of the SoftMax layer applied to at least one of: (i) each of the plurality of channels collectively, and (ii) each of the plurality of channels individually, comprising instructions that when executed by the processor to cause the processor to: subsequent to applying the SoftMax function, perform an element-wise multiplication of the first feature map and an output of the SoftMax function to generate a modulated feature map to encode the first image as part of an encoded video.

Example 18 includes the subject matter of example 11, the neural network comprising a convolutional neural network, the spatial and temporal saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network when encoding the first image without the attention layer.

Example 19 includes the subject matter of example 11, comprising instructions that when executed by the processor to cause the processor to: apply a batch normalization process to the modulated feature map.

Example 20 includes the subject matter of example 11, comprising instructions to train the neural network that when executed by the processor to cause the processor to: configure an output of each attention layer in the neural network to equal one; pretrain weights of the neural network where gradients flow into routes that do not include the attention layers during backward propagation; and refine the neural network by retraining all pretrained weights and weights in each attention layer such that gradients flow into all routes of the neural network until convergence is reached.

Example 21 is a method, comprising: generating a first feature map of a first image by a first layer of a neural network, the neural network executing on a computer processor to encode the first image; computing, by an attention layer of the neural network based on the first feature map of the first image, an adaptive spatial saliency map for the first feature map of the first image; and performing an element-wise multiplication of the first feature map and the adaptive spatial saliency map for the first feature map to generate a modulated feature map to encode the first image.

Example 22 includes the subject matter of example 21, further comprising: applying, by a SoftMax layer of the neural network, a SoftMax function to the adaptive spatial saliency map for the first feature map prior to performing the element-wise multiplication, the SoftMax function to cause a sum of each value in the adaptive spatial saliency map to equal one.

Example 23 includes the subject matter of example 22, the first image comprising a plurality of channels, the SoftMax function of the SoftMax layer applied to at least one of: (i) each of the plurality of channels collectively, and (ii) each of the plurality of channels individually.

Example 24 includes the subject matter of example 21, the neural network comprising a convolutional neural network, the adaptive spatial saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network without the attention layer.

Example 25 includes the subject matter of example 21, the first image of a video comprising at least the first image and a second image, the second image adjacent and prior to the first image in the video, the neural network to encode the video according to at least one encoding format, the method further comprising: concatenating the adaptive spatial saliency map for the first image and an adaptive spatial saliency map for the second image; and computing, by a second layer of the neural network, a spatial and temporal saliency map for the first image based on the concatenation of the adaptive spatial saliency map for the first image and the adaptive spatial saliency map for the second image.

Example 26 includes the subject matter of example 25, further comprising applying, by a SoftMax layer of the neural network, a SoftMax function to the spatial and temporal saliency map for the first image, the SoftMax function to cause a sum of each value in the spatial and temporal saliency map for the first image to equal one.

Example 27 includes the subject matter of example 26, the first image comprising a plurality of channels, the SoftMax function of the SoftMax layer applied to at least one of: (i) each of the plurality of channels collectively, and (ii) each of the plurality of channels individually, the method further comprising: subsequent to applying the SoftMax function, performing an element-wise multiplication of the first feature map and an output of the SoftMax function to generate a modulated feature map to encode the first image as part of an encoded video.

Example 28 includes the subject matter of example 27, the neural network comprising a convolutional neural network, the spatial and temporal saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network when encoding the first image without the attention layer.

Example 29 includes the subject matter of example 21, wherein the neural network is to encode the image according to at least one encoding format, the method further comprising: applying a batch normalization process to the modulated feature map.

Example 30 includes the subject matter of example 21, further comprising training the neural network by: configuring an output of each attention layer in the neural network to equal one; pretraining weights of the neural network where gradients flow into routes that do not include the attention layers during backward propagation; and refining the neural network by retraining all pretrained weights and weights in each attention layer such that gradients flow into all routes of the neural network until convergence is reached.

Example 31 is an apparatus, comprising: means for generating a first feature map of a first image by a first layer of a neural network, the neural network executing on a computer processor to encode the first image; means for computing, by an attention layer of the neural network based on the first feature map of the first image, an adaptive spatial saliency map for the first feature map of the first image; and means for performing an element-wise multiplication of the first feature map and the adaptive spatial saliency map for the first feature map to generate a modulated feature map to encode the first image.

Example 32 includes the subject matter of example 31, further comprising: means for applying, by a SoftMax layer of the neural network, a SoftMax function to the adaptive spatial saliency map for the first feature map prior to performing the element-wise multiplication, the SoftMax function to cause a sum of each value in the adaptive spatial saliency map to equal one.

Example 33 includes the subject matter of example 32, the first image comprising a plurality of channels, the SoftMax function of the SoftMax layer applied to at least one of: (i) each of the plurality of channels collectively, and (ii) each of the plurality of channels individually.

Example 34 includes the subject matter of example 31, the neural network comprising a convolutional neural network, the adaptive spatial saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network without the attention layer.

Example 35 includes the subject matter of example 31, the first image of a video comprising at least the first image and a second image, the second image adjacent and prior to the first image in the video, the neural network to encode the video according to at least one encoding format, the apparatus further comprising: means for concatenating the adaptive spatial saliency map for the first image and an adaptive spatial saliency map for the second image; and means for computing, by a second layer of the neural network, a spatial and temporal saliency map for the first image based on the concatenation of the adaptive spatial saliency map for the first image and the adaptive spatial saliency map for the second image.

Example 36 includes the subject matter of example 35, further comprising means for applying, by a SoftMax layer of the neural network, a SoftMax function to the spatial and temporal saliency map for the first image, the SoftMax function to cause a sum of each value in the spatial and temporal saliency map for the first image to equal one.

Example 37 includes the subject matter of example 36, the first image comprising a plurality of channels, the SoftMax function of the SoftMax layer applied to at least one of: (i) each of the plurality of channels collectively, and (ii) each of the plurality of channels individually, the apparatus further comprising: means for subsequent to applying the SoftMax function, performing an element-wise multiplication of the first feature map and an output of the SoftMax function to generate a modulated feature map to encode the first image as part of an encoded video.

Example 38 includes the subject matter of example 37, the neural network comprising a convolutional neural network, the spatial and temporal saliency map to cause the convolutional neural network to allocate a first number of bits when encoding a first portion of the first image, the first portion of image depicting a visual element associated with a human visual system (HVS), the element comprising at least one of: (i) a face, (ii) a high contrast region, (iii) a human, and (iv) an object, the first number of bits greater than a second number of bits allocated to the first portion of the image by the neural network when encoding the first image without the attention layer.

Example 39 includes the subject matter of example 31, wherein the neural network is to encode the image according to at least one encoding format, the apparatus further comprising: means for applying a batch normalization process to the modulated feature map.

Example 40 includes the subject matter of example 31, further comprising means for training the neural network, comprising: means for configuring an output of each attention layer in the neural network to equal one; means for pretraining weights of the neural network where gradients flow into routes that do not include the attention layers during backward propagation; and means for refining the neural network by retraining all pretrained weights and weights in each attention layer such that gradients flow into all routes of the neural network until convergence is reached.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The following examples pertain to further embodiments, from which numerous permutations and configurations will be apparent.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
a processor circuit; and
a memory storing instructions which when executed by the processor circuit cause the processor circuit to:
generate a first feature map of a first image by a first layer of a neural network, the neural network to encode the first image at a defined bitrate;
compute, by an attention layer of the neural network based on the first feature map of the first image, an adaptive spatial saliency map for the first feature map of the first image, wherein a sum of all values of the adaptive spatial saliency map equals one; and
perform an element-wise multiplication of the first feature map and the adaptive spatial saliency map for the first feature map to generate a modulated feature map to encode the first image, the modulated feature map to have relatively higher activations on portions of the first image that are higher regions of interest to a human visual system (HVS) and relatively lower activations on portions of the first image that are lower regions of interest to the HVS while keeping the defined bitrate constant.

2. The apparatus of claim 1, the memory storing instructions which when executed by the processor circuit cause the processor circuit to:
apply, by a SoftMax layer of the neural network, a SoftMax function to the adaptive spatial saliency map for the first feature map prior to performing the element-wise wise multiplication, the SoftMax function to cause a sum of all values in the adaptive spatial saliency map to equal one.

3. The apparatus of claim 2, the first image comprising a plurality of channels, the SoftMax function of the SoftMax layer applied to at least one of: (i) each of the plurality of channels collectively, and (ii) each of the plurality of channels individually.

4. The apparatus of claim 1, the neural network comprising a convolutional neural network, the adaptive spatial saliency map to cause the convolutional neural network to allocate a first number of bits when encoding a first portion of the first image, the first portion of the first image depicting a visual element associated with the HVS, the element comprising at least one of: (i) a face, (ii) a high contrast region, (iii) a human, and (iv) an object, the first number of bits greater than a second number of bits allocated to the first portion of the first image by the neural network without the attention layer.

5. The apparatus of claim 1, the first image of a video comprising at least the first image and a second image, the second image adjacent and prior to the first image in the video, the neural network to encode the video according to at least one encoding format, the memory storing instructions which when executed by the processor circuit to:

concatenate the adaptive spatial saliency map for the first image and an adaptive spatial saliency map for the second image; and compute, by a second layer of the neural network, a spatial and temporal saliency map for the first image based on the concatenation of the adaptive spatial saliency map for the first image and the adaptive spatial saliency map for the second image.

6. The apparatus of claim 5, the memory storing instructions which when executed by the processor circuit cause the processor circuit to:

apply, by a SoftMax layer of the neural network, a SoftMax function to the spatial and temporal saliency map for the first image, the SoftMax function to cause a sum of all values in the spatial and temporal saliency map for the first image to equal one.

7. The apparatus of claim 6, the first image comprising a plurality of channels, the SoftMax function of the SoftMax layer applied to at least one of: (i) each of the plurality of channels collectively, and (ii) each of the plurality of channels individually, the memory storing instructions which when executed by the processor circuit cause the processor circuit to:

subsequent to applying the SoftMax function, perform an element-wise multiplication of the first feature map and an output of the SoftMax function to generate a modulated feature map to encode the first image as part of an encoded video.

8. The apparatus of claim 7, the neural network comprising a convolutional neural network, the spatial and temporal saliency map to cause the convolutional neural network to allocate a first number of bits when encoding a first portion of the first image, the first portion of the first image depicting a visual element associated with the HVS, the element comprising at least one of: (i) a face, (ii) a high contrast region, (iii) a human, and (iv) an object, the first number of bits greater than a second number of bits allocated to the first portion of the first image by the neural network when encoding the first image without the attention layer.

9. The apparatus of claim 1, wherein the neural network is to encode the image according to at least one encoding format, the memory storing instructions which when executed by the processor circuit cause the processor circuit to:

apply a batch normalization process to the modulated feature map.

10. The apparatus of claim 1, the memory storing instructions to train the neural network which when executed by the processor circuit cause the processor circuit to:

configure an output of each attention layer in the neural network to equal one;

pretrain weights of the neural network where gradients flow into routes that do not include the attention layers during backward propagation; and refine the neural network by retraining all pretrained weights and weights in each attention layer such that gradients flow into all routes of the neural network until convergence is reached.

11. A non-transitory computer-readable storage medium comprising instructions that when executed by a processor of a computing device, cause the processor to:

generate a first feature map of a first image by a first layer of a neural network, the neural network to encode the first image at a defined bitrate;

compute, by an attention layer of the neural network based on the first feature map of the first image, an adaptive spatial saliency map for the first feature map of the first image, wherein a sum of all values of the adaptive spatial saliency map equals one; and perform an element-wise multiplication of the first feature map and the adaptive spatial saliency map for the first feature map to generate a modulated feature map to encode the first image, the modulated feature map to have relatively higher activations on portions of the first image that are higher regions of interest to a human visual system (HVS) and relatively lower activations on portions of the first image that are lower regions of interest to the HVS while keeping the defined bitrate constant.

12. The non-transitory computer-readable storage medium of claim 11, comprising instructions that when executed by the processor to cause the processor to:

apply, by a SoftMax layer of the neural network, a SoftMax function to the adaptive spatial saliency map for the first feature map prior to performing the element-wise multiplication, the SoftMax function to cause a sum of all values in the adaptive spatial saliency map to equal one.

13. The non-transitory computer-readable storage medium of claim 12, the first image comprising a plurality of channels, the SoftMax function of the SoftMax layer applied to at least one of: (i) each of the plurality of channels collectively, and (ii) each of the plurality of channels individually.

14. The non-transitory computer-readable storage medium of claim 11, the neural network comprising a convolutional neural network, the adaptive spatial saliency map to cause the convolutional neural network to allocate a first number of bits when encoding a first portion of the first image, the first portion of the first image depicting a visual element associated with the HVS, the element comprising at least one of: (i) a face, (ii) a high contrast region, (iii) a human, and (iv) an object, the first number of bits greater than a second number of bits allocated to the first portion of the first image by the neural network without the attention layer.

15. The non-transitory computer-readable storage medium of claim 11, the first image of a video comprising at least the first image and a second image, the second image adjacent and prior to the first image in the video, the neural network to encode the video according to at least one encoding format, comprising instructions that when executed by the processor to cause the processor to:

concatenate the adaptive spatial saliency map for the first image and an adaptive spatial saliency map for the second image; and compute, by a second layer of the neural network, a spatial and temporal saliency map for the first image based on the concatenation of the adaptive spatial saliency map for the first image and the adaptive spatial saliency map for the second image.

16. The non-transitory computer-readable storage medium of claim 15, comprising instructions that when executed by the processor to cause the processor to:

apply, by a SoftMax layer of the neural network, a SoftMax function to the spatial and temporal saliency map for the first image, the SoftMax function to cause a sum of all values in the spatial and temporal saliency map for the first image to equal one.

17. The non-transitory computer-readable storage medium of claim 16, the first image comprising a plurality of channels, the SoftMax function of the SoftMax layer applied to at least one of: (i) each of the plurality of channels collectively, and (ii) each of the plurality of channels individually, comprising instructions that when executed by the processor to cause the processor to:
  subsequent to applying the SoftMax function, perform an element-wise multiplication of the first feature map and an output of the SoftMax function to generate a modulated feature map to encode the first image as part of an encoded video.

18. The non-transitory computer-readable storage medium of claim 17, the neural network comprising a convolutional neural network, the spatial and temporal saliency map to cause the convolutional neural network to allocate a first number of bits when encoding a first portion of the first image, the first portion of the first image depicting a visual element associated with the HVS, the element comprising at least one of: (i) a face, (ii) a high contrast region, (iii) a human, and (iv) an object, the first number of bits greater than a second number of bits allocated to the first portion of the first image by the neural network when encoding the first image without the attention layer.

19. The non-transitory computer-readable storage medium of claim 11, comprising instructions that when executed by the processor to cause the processor to:
  apply a batch normalization process to the modulated feature map.

20. The non-transitory computer-readable storage medium of claim 11, comprising instructions to train the neural network that when executed by the processor to cause the processor to:
  configure an output of each attention layer in the neural network to equal one;
  pretrain weights of the neural network where gradients flow into routes that do not include the attention layers during backward propagation; and
  refine the neural network by retraining all pretrained weights and weights in each attention layer such that gradients flow into all routes of the neural network until convergence is reached.

21. A method, comprising:
  generating a first feature map of a first image by a first layer of a neural network, the neural network executing on a computer processor to encode the first image at a defined bitrate;
  computing, by an attention layer of the neural network based on the first feature map of the first image, an adaptive spatial saliency map for the first feature map of the first image, wherein a sum of all values of the adaptive spatial saliency map equals one; and
  performing an element-wise multiplication of the first feature map and the adaptive spatial saliency map for the first feature map to generate a modulated feature map to encode the first image, the modulated feature map to have relatively higher activations on portions of the first image that are higher regions of interest to a human visual system (HVS) and relatively lower activations on portions of the first image that are lower regions of interest to the HVS while keeping the defined bitrate constant.

22. The method of claim 21, further comprising:
  applying, by a SoftMax layer of the neural network, a SoftMax function to the adaptive spatial saliency map for the first feature map prior to performing the element-wise multiplication, the SoftMax function to cause a sum of all values in the adaptive spatial saliency map to equal one.

23. The method of claim 22, the first image comprising a plurality of channels, the SoftMax function of the SoftMax layer applied to at least one of: (i) each of the plurality of channels collectively, and (ii) each of the plurality of channels individually.

24. The method of claim 21, the neural network comprising a convolutional neural network, the adaptive spatial saliency map to cause the convolutional neural network to allocate a first number of bits when encoding a first portion of the first image, the first portion of the first image depicting a visual element associated with the HVS, the element comprising at least one of: (i) a face, (ii) a high contrast region, (iii) a human, and (iv) an object, the first number of bits greater than a second number of bits allocated to the first portion of the first image by the neural network without the attention layer.

25. The method of claim 21, the first image of a video comprising at least the first image and a second image, the second image adjacent and prior to the first image in the video, the neural network to encode the video according to at least one encoding format, the method further comprising:
  concatenating the adaptive spatial saliency map for the first image and an adaptive spatial saliency map for the second image; and
  computing, by a second layer of the neural network, a spatial and temporal saliency map for the first image based on the concatenation of the adaptive spatial saliency map for the first image and the adaptive spatial saliency map for the second image.

* * * * *

UNITED STATES PATENT AND TRADEMARK OFFICE
CERTIFICATE OF CORRECTION

| | | |
|---|---|---|
| PATENT NO. | : 11,887,005 B2 | |
| APPLICATION NO. | : 17/254056 | |
| DATED | : January 30, 2024 | |
| INVENTOR(S) | : Man Lan Wong et al. | |

It is certified that error appears in the above-identified patent and that said Letters Patent is hereby corrected as shown below:

In the Claims

In Column 22, Claim 2, Line 42, delete "wise multiplication," and insert -- multiplication, --, therefor.

Signed and Sealed this
Twenty-seventh Day of February, 2024

Katherine Kelly Vidal
*Director of the United States Patent and Trademark Office*